(12) United States Patent
Stenbacka et al.

(10) Patent No.: US 11,054,722 B2
(45) Date of Patent: *Jul. 6, 2021

(54) FLASH HOUSING FOR PHOTOGRAPHIC PURPOSES AND A METHOD FOR SIMULATING A FLASH LIGHT

(71) Applicant: PROFOTO AKTIEBOLAG, Sundbyberg (SE)

(72) Inventors: Emil Stenbacka, Stockholm (SE); Johan Anséhn, Stockholm (SE)

(73) Assignee: PROFOTO AKTIEBOLAG, Sundbyberg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/646,118

(22) PCT Filed: Sep. 17, 2018

(86) PCT No.: PCT/SE2018/050940
§ 371 (c)(1),
(2) Date: Mar. 10, 2020

(87) PCT Pub. No.: WO2019/054933
PCT Pub. Date: Mar. 21, 2019

(65) Prior Publication Data
US 2020/0218135 A1    Jul. 9, 2020

(30) Foreign Application Priority Data

Sep. 18, 2017    (SE) .................................... 1751151-0

(51) Int. Cl.
*G03B 15/05*    (2021.01)
*F21V 14/02*    (2006.01)
(Continued)

(52) U.S. Cl.
CPC .............. *G03B 15/05* (2013.01); *F21V 14/02* (2013.01); *F21V 14/025* (2013.01); *F21V 14/04* (2013.01);
(Continued)

(58) Field of Classification Search
CPC ........ F21V 14/02; F21V 14/025; F21V 14/04; F21V 14/045; F21V 14/06; F21V 14/065;
(Continued)

(56) References Cited

U.S. PATENT DOCUMENTS

| 2,906,862 A | 9/1959 | McCammon |
| 4,141,059 A | 2/1979 | Shiojiri |

(Continued)

FOREIGN PATENT DOCUMENTS

| CN | 205103528 U | 3/2016 |
| CN | 205137343 U | 4/2016 |

(Continued)

OTHER PUBLICATIONS

U.S. Appl. No. 16/646,121, filed Mar. 10, 2020.
(Continued)

*Primary Examiner* — Alexander K Garlen
*Assistant Examiner* — Colin J Cattanach
(74) *Attorney, Agent, or Firm* — Knobbe, Martens, Olson & Bear, LLP

(57) ABSTRACT

A flash housing for photographic purposes is disclosed. The flash housing comprises a flash forming element arranged to generate a flash light and a lens element arranged to let at least part of the generated flash light out of the flash housing so as to obtain the flash. The obtainable flash light has a beam lobe with a controllable beam angle. A simulation light generator element is arranged for simulation of the obtainable flash light beam lobe having the controllable beam angle.

19 Claims, 6 Drawing Sheets

(51) Int. Cl.
*F41H 13/00* (2006.01)
*F21V 14/04* (2006.01)
*G03B 15/035* (2021.01)
*F21V 14/06* (2006.01)
*G03B 7/16* (2021.01)
*G03B 15/03* (2021.01)

(52) U.S. Cl.
CPC ............. *F21V 14/045* (2013.01); *F21V 14/06* (2013.01); *F21V 14/065* (2013.01); *F41H 13/0087* (2013.01); *G03B 7/16* (2013.01); *G03B 15/03* (2013.01); *G03B 15/035* (2013.01); *G03B 2215/05* (2013.01); *G03B 2215/051* (2013.01); *G03B 2215/0521* (2013.01); *G03B 2215/0525* (2013.01); *G03B 2215/0528* (2013.01); *G03B 2215/0553* (2013.01); *G03B 2215/0567* (2013.01); *G03B 2215/0571* (2013.01)

(58) Field of Classification Search
CPC .. G03B 15/03; G03B 15/035; G03B 2215/05; G03B 2215/051; G03B 2215/0521; G03B 2215/0525; G03B 2215/0528; G03B 2215/0553; G03B 2215/0567; G03B 2215/0571; G03B 7/16; F41H 13/0087
See application file for complete search history.

(56) References Cited

U.S. PATENT DOCUMENTS

| | | | | |
|---|---|---|---|---|
| 4,356,538 | A * | 10/1982 | Plummer | G03B 15/05 362/16 |
| 4,423,940 | A | 1/1984 | Kashihara et al. | |
| 4,662,733 | A | 5/1987 | Feinbloom | |
| 4,914,461 | A | 4/1990 | Hori | |
| 4,916,579 | A | 4/1990 | Simms | |
| 5,019,845 | A * | 5/1991 | Asakura | G03B 15/05 396/175 |
| 5,023,639 | A * | 6/1991 | Ushiro | G03B 15/05 362/8 |
| 5,871,272 | A * | 2/1999 | Sharrah | F21L 4/025 362/184 |
| 5,878,291 | A * | 3/1999 | Hagiuda | G03B 15/05 396/175 |
| 6,178,297 | B1 | 1/2001 | Ting | |
| 6,349,175 | B1 | 2/2002 | Tokunaga | |
| 6,481,869 | B1 * | 11/2002 | Horandel | F21V 14/065 362/249.12 |
| 6,866,401 | B2 | 3/2005 | Sommers et al. | |
| 7,321,725 | B2 | 1/2008 | Seo et al. | |
| 7,510,289 | B2 * | 3/2009 | Takekuma | H01L 25/0753 257/99 |
| 7,684,691 | B2 | 3/2010 | Tokunaga | |
| 8,665,358 | B2 | 3/2014 | Cho et al. | |
| 9,110,355 | B1 | 8/2015 | Nourbakhsh | |
| 2002/0064384 | A1 | 5/2002 | Kawasaki et al. | |
| 2008/0259274 | A1 | 10/2008 | Chinnock | |
| 2009/0196595 | A1 | 8/2009 | Okubo | |
| 2012/0219277 | A1 * | 8/2012 | Hartwig | F21V 5/04 396/62 |
| 2015/0155728 | A1 | 6/2015 | Feustel et al. | |
| 2016/0088278 | A1 | 3/2016 | Velarde et al. | |
| 2020/0272028 | A1 * | 8/2020 | Stenbacka | G02B 7/04 |

FOREIGN PATENT DOCUMENTS

| | | |
|---|---|---|
| EP | 0382624 A2 | 8/1990 |
| EP | 3163370 A1 | 5/2017 |
| JP | 60-83921 A | 5/1985 |
| JP | 2005-136657 A | 5/2005 |
| JP | 2007-218994 A | 8/2007 |

OTHER PUBLICATIONS

International Search Report and Written Opinion of the International Authority for International Application No. PCT/SE2018/050943, dated Dec. 11, 2018, in 13 pages.
International Search Report and Written Opinion of the International Authority for International Application No. PCT/SE2018/050940, dated Dec. 14, 2018, in 10 pages.
Nikon SB-700 user manual, selected pages, retrieved from https://downloadcenter.nikonimglib.com/en/products/245/SB-700.html on Dec. 31, 2020 (Year: 2010).
Extended European Search Report for European Patent Application No. 18857327.3, dated Apr. 19, 2021, in 7 pages.
Search Report issued in Chinese Patent Application No. 201880060284.X, dated Apr. 6, 2021, in 2 pages (English translation only).
Extended European Search Report for European Patent Application No. 18857164.0, dated May 3, 2021, in 7 pages.

* cited by examiner

Beam angle setting

FLASH HOUSING FOR PHOTOGRAPHIC PURPOSES AND A METHOD FOR SIMULATING A FLASH LIGHT

CROSS-REFERENCE TO RELATED APPLICATIONS

This application is the U.S. National Phase under 35 U.S.C. § 371 of International Application PCT/SE2018/050940, filed Sep. 17, 2018, which claims priority to SE Application No. 1751151-0, filed Sep. 18, 2017, the entire contents of each of which are incorporated by reference herein and made a part of this specification.

TECHNICAL FIELD

The present disclosure related to a flash housing arranged to generate a flash light and to let at least part of the generated flash light out of the flash housing so as to obtain the flash.

The present disclosure further relates to a method for simulating a flash light.

BACKGROUND

In order to be able to take photographs of a certain quality a flash device is often used to provide light or to improve the light in the photograph.

There are flash housings known in the art arranged to generate a flash light and to let at least part of the generated flash light out of the flash housing so as to obtain the flash.

SUMMARY

One object of the present disclosure is to improve the flash light for photographic purposes.

This has in different embodiments been achieved by means of a flash housing for photographic purposes. The flash housing comprises a flash forming element arranged to generate a flash light and a lens element arranged to let at least part of the generated flash light out of the flash housing so as to obtain the flash. The obtainable flash light has a beam lobe with a controllable beam angle. The flash housing comprises a simulation light generator element for simulation of the obtainable flash light beam lobe having the controllable beam angle.

Accordingly, the beam angle of the simulation light substantially coincides with the beam angle of the flash light obtained when the flash is activated.

In order to create photographs of a high quality, where the photographer is able to enhance a photograph by means of a flash light, it is important to be able to generate a flash light with a beam lobe of a desired shape and quality. This disclosure discloses a solution where means for adjustment of the simulation light are provided which allows for easy and accurate adjustment.

The flash light characteristically lasts a very short time period. When preparing for taking a picture enlightened with flash light, the simulation light generator element provides a simulation light which can be lit for a substantially longer time period than the flash light. The simulation light simulates the distribution of the flash light beam lobe. Thus, the simulation light has characteristically a beam lobe substantially coinciding with a current setting of the beam lobe of the flash light. The simulation light can be lit while manually adjusting the beam lobe of the simulation light and consequently, the setting of the beam lobe of the flash light.

Therefore, the simulation light provides an aid for the photographer to finely adjust the setting of the beam angle of the flash light setting. Due to the short duration of the flash light, this fine-tuning of the area in the photograph which area is supposed to be enlightened cannot be made using the flash light itself.

The flash housing is typically a small device such as an external flash device connectable to a camera. The flash housing may act both as an on-camera flash and as an off-camera flash. The off-camera flash may be adapted to communicate, possibly, wirelessly, with the camera.

The simulation light generator element may be arranged at or adjacent to the lens element.

In one option, the simulation light generator element comprises at least two light emitting diode, LED, elements, having different beam angles. The flash housing may then comprise a control element arranged to control the brightness of the at least two LED elements in accordance with a determined beam angle of the flash light beam lobe.

In different embodiments, the respective LED element comprises a LED and a lens arranged in the beam path after the LED. The lens of the respective LED element is integrated in the lens element.

In different embodiments the at least two LED elements comprise a first LED element having a beam angle substantially corresponding to a minimum beam angle of the flash light beam lobe and a second LED element having a beam angle substantially corresponding to a maximum beam angle of the flash light beam lobe. The control element is then arranged to control the brightness of the at least two LED elements in accordance with a determined beam angle of the flash light beam lobe.

Further, additional LED element(s) may also be added having beam angle(s) between the minimum beam angle of the flash light and the maximum beam angle of the flash light.

In different embodiments, the flash housing further comprises a zoom element rotatably arranged at least partly along the circumference of the lens element for manual control of the simulation light generator element in accordance with the rotational position and/or movement of the zoom element.

The simulation light beam angle is easily adjusted using the zoom element. The zoom element is manually rotated clockwise or counter-clockwise to alter the simulation light beam angle. Further, the adjustment can be made with high accuracy as the zoom element provides a rotational control having a diameter even larger than the diameter of the lens element. Thus, the relatively small flash housing accommodates a relatively large rotational control substantially without altering the design and size of the flash housing. Further, manual operation of the zoom element is intuitive and easy to use, as the zoom element is manually operated in line with manual operation of a camera zoom.

Manual adjustment of the flash light aided by the simulation light can be performed at any time to match the user's preferences. For example, manual adjustment of the flash light aided by the simulation light may be made such that the flash light, when activated, is narrow to highlight a selected part of a photograph. The simulation light is easy to control and can be set creatively. Further, several flash housings can be in communication with each other and cooperate to grow light shaping.

The zoom element may also be operatively connected to the flash forming element so as to control movement of the flash forming element by manual rotation of the zoom element.

In using the flash housing as presented above, the flash forming element, and accordingly flash light beam angle, is adjusted manually, by turning the zoom element. Thus, in different embodiments, the zoom element is arranged to control movement of the flash forming element to obtain a flash having a beam lobe with a desired beam angle.

Thus, rotation of the zoom element may cause the flash forming element to move to a certain position where the flash light has a determined beam angle, when activated, simultaneously adjust the simulation light to have a beam angle corresponding to the determined flash light beam angle.

The flash forming element may be axially movable within the flash housing to control the beam angle of the beam lobe The flash forming element may comprise a flash tube and a reflector. Thereby, an efficient flash light can be created, wherein a large amount of light is emitted from the flash tube in a short period of time.

In different embodiments, the flash housing further comprises a transfer element arranged to transfer the rotational movement or position of the zoom element to an electrical signal. The intensities of the LED elements are the controlled based on the electrical signal. Also the flash forming element may be controlled based on this electrical signal.

The transfer element may comprise a potentiometer, a Hall element, optical sensors or the like, arranged to transfer the rotational movement or position of the zoom element to the electrical signal.

The flash housing may further comprise a display element, wherein the information related to the electrical signal is fed to the display element for display of information related to the simulated flash light beam angle.

The display element may be arranged to display a symbol, the width of which is dependent on the simulated flash light beam angle. The symbol may have a U shape.

The use of such symbol for illustrating the simulation light beam angle provides a very intuitive understanding of a current flash light beam angle and its relation to the maximum and minimum flash light beam angles.

In different embodiments, the simulated flash light beam lobe has an essentially circular cross section. The cross section is characteristically arranged perpendicular to a beam axis of the simulated flash light beam lobe.

The present disclosure further relates to a method for simulating a flash light setting of a flash light for photographic purposes. The method comprises determining an adjustable beam angle of a flash light beam lobe obtainable by means of a flash housing having a flash forming element arranged to generate a flash light and a lens element arranged to let at least a part of the generated flash light out of the flash light housing so as to obtain the flash, and simulating the flash light beam lobe by means of a simulation light generator element arranged at the lens element, based on the determined beam angle.

In an option where the simulation light generator element comprises at least two light emitting diodes, LED, elements having different beam angles, the simulation step may comprise determining at least one intensity (brightness?) of a simulation light generator element based on the determined beam angle, based on the determined beam angle, and controlling the at least two LED elements in accordance with the determined intensities (brightnesses).

BRIEF DESCRIPTION OF THE DRAWINGS

FIG. 1b is a view from behind of the flash device in FIG. 1a.

DETAILED DESCRIPTION

The present disclosure relates in different embodiments to simulating a flash light setting of a flash light for photographic purposes. The disclosure relates to use of flash housing having a flash forming element arranged to generate a flash light and a lens element arranged to let at least a part of the generated flash light out of the flash light housing so as to obtain the flash light. In accordance with this disclosure, an adjustable beam angle of a flash light beam lobe obtainable by means of the flash housing is determined. The flash light beam lobe may then be simulated by means of a simulation light generator element arranged at the lens element, based on the determined beam angle.

Figure 1A:
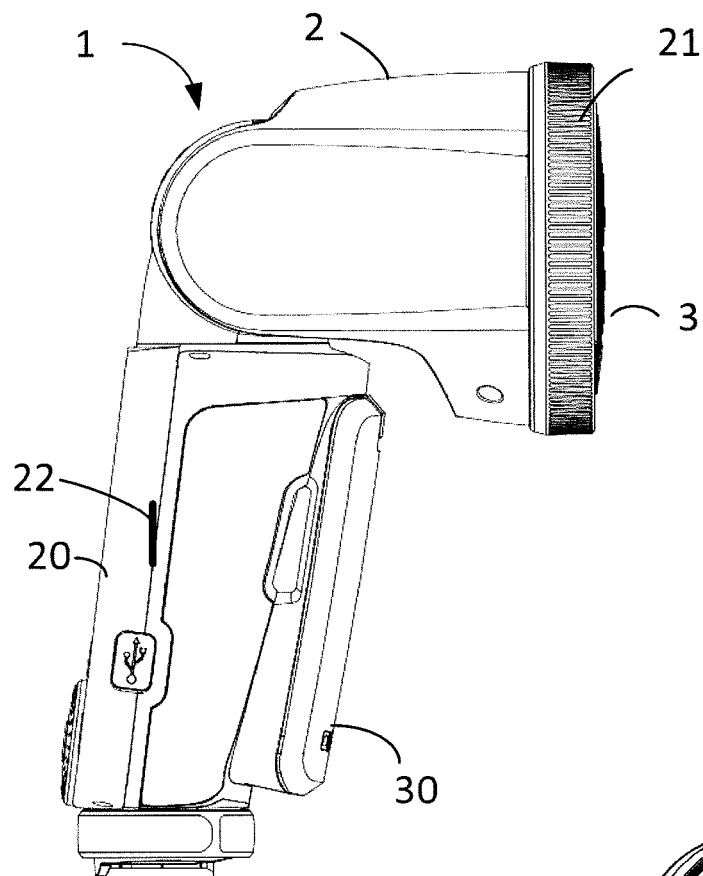
FIG. 1a is a side view of a flash device according to one example.
Figure 1B:
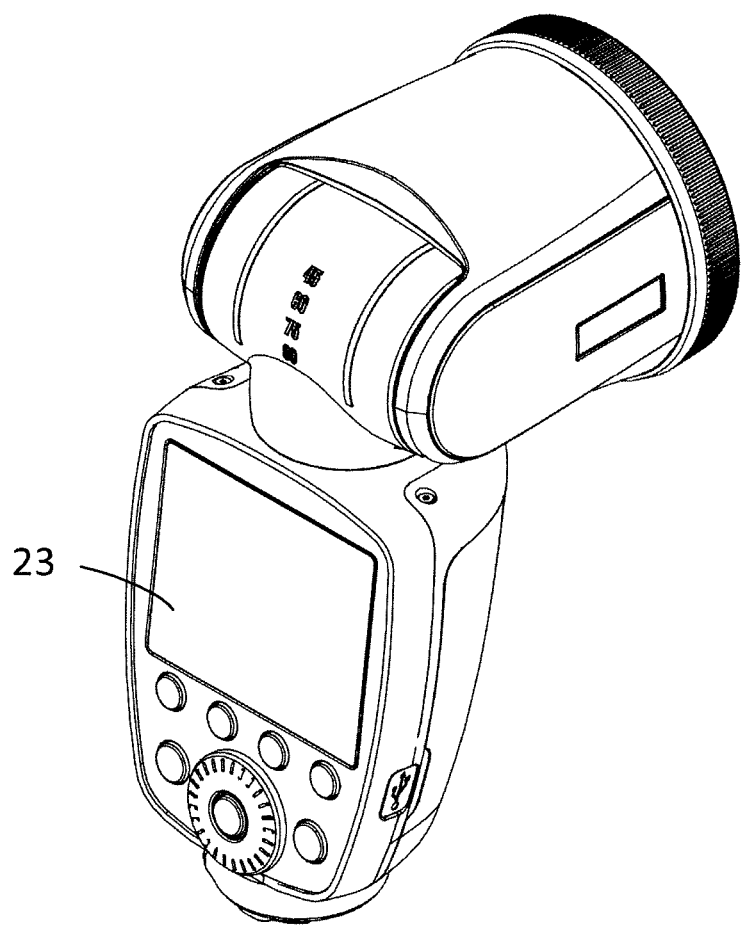

FIGS. 1a and 1b illustrate a flash device 1 according to one example. The flash device 1 is arranged to be used for photographic purposes. According to one example, the flash device 1 is arranged to be releasably attachable to a camera. The flash device 1 comprises in the illustrated example a flash holder 20 and a flash housing 2 hinged onto the flash holder 20. The flash device further comprises a releasable battery 30, attached to the flash holder 20. The flash housing is equipped with a lens element 3 arranged to affect the generated flash light in a desired way.

In the illustrated example, the flash device 1 has further a display element 23. In the illustrated example, the flash device has also a control element 22 for electrical control of the flash device.

Figure 6A:
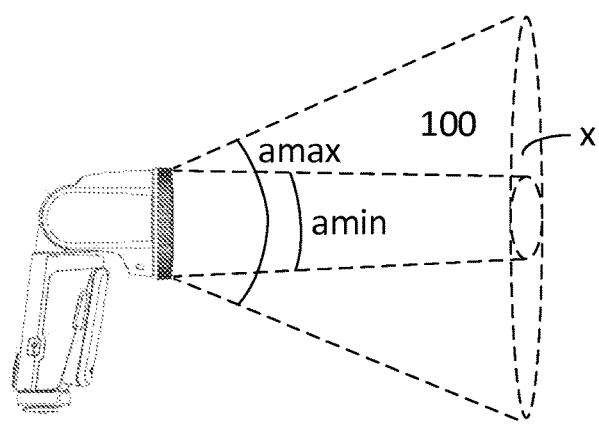
FIG. 6a is s schematic side view of a flash device according to one example, where flash light beam lobes are schematically illustrated.

FIG. 6a illustrates schematically a side view of a flash device, where an example of a maximum and minimum flash light beam lobe is schematically illustrated. The flash light is controllable between the minimum and the maximum beam angles.

Figure 8:
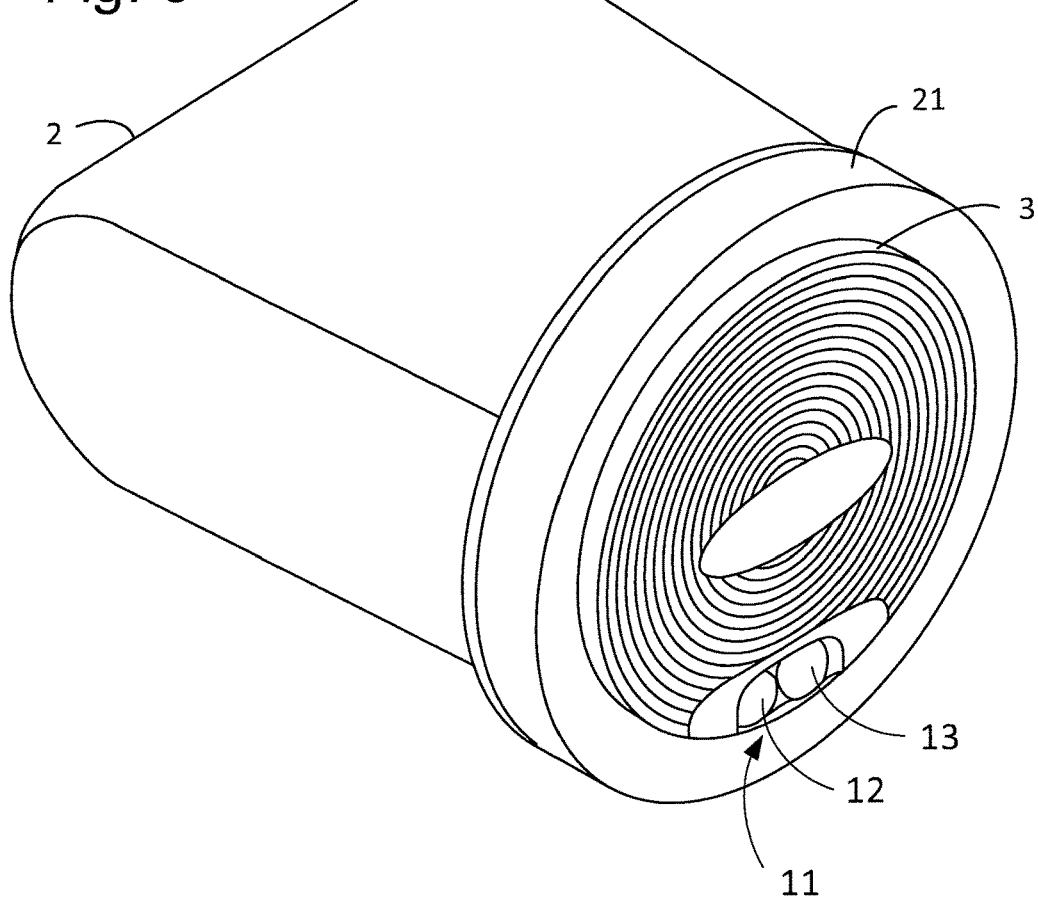
FIG. 8 illustrates an example of a flash housing provided with a simulation light generator element for simulation of a flash light beam lobe.

In FIG. 8, a flash housing 2 for photographic purposes is illustrated, arranged to obtain a flash light with an adjustable flash light beam lobe. The flash housing 2 comprises a lens 3 and a zoom element 21. The zoom element 21 is rotatably arranged at least partly along the circumference of the lens element 3.

A simulation light generator element 11 is arranged at the flash housing for simulation of the beam lobe of flash light emittable from the flash housing. Characteristically, the simulation light generator element is arranged to generate light in accordance with the rotational position/movement of the zoom element In the illustrated example, the simulation light generator element 11 is arranged at the lens element. In the illustrated example, the simulation light generator element is at least partly integrated with the lens element. However, this is only an example. The simulation light generator element may for example be positioned spaced apart from the lens element. The simulation light generator element may for example be arranged within an interior of the flash housing. Alternatively, the simulation light generator element may be arranged anywhere at the exterior of the flash housing or flash device.

The zoom element 21 may further be operatively connected to the flash forming element (not illustrated) so as to control movement of the flash forming element by manual rotation of the zoom element. The zoom element 21 is then arranged to control movement of the flash forming element to enable emission of a flash light having a beam lobe with a desired beam angle while also controlling the simulation light generator element for emission of simulation light with a coinciding beam lobe.

This allows for fine-tuning the design of the flash light so as to use the flash light to enhance the lightning properties of the photograph as much as possible. The flash light characteristically lasts a very short time period. When preparing for taking a picture enlightened with flash light, the simulation light generator element provides a simulation light which can be lit for a substantially longer time period than the flash light. The simulation light simulates the distribution of the flash light. The simulation light characteristically has a beam lobe substantially coinciding with the beam lobe of the flash light with the current position of the flash forming element. This can be used by a photographer by having the simulation light lit while manually adjusting the beam lobe of the simulation light and consequently, the beam lobe of the flash light by means of the zoom element. Therefore the simulation light provides an aid for the photographer to finely adjust the flash light setting. Due to the short duration of the flash light, this fine-tuning of the area in the photograph to be taken which is supposed to be enlightened cannot be made using the flash light itself.

The simulation light generator element 11 comprises in accordance with the illustrated example at least two light emitting diode, LED, elements 12, 13. The at least two LED elements 12, 13 have different beam angles. The flash housing comprises a control element (not illustrated) arranged to control the brightness of the at least two LED elements 12, 13 based on the motion/rotational position of the zoom element so as to simulate the flash light beam lobe. The control element may be formed in a flash device as disclosed in FIGS. 1*a*, 1*b*. The control element may instead be arranged elsewhere at the flash device.

The respective LED element 12, 13 may comprise a LED and a lens arranged in the beam path after the LED. In the illustrated example, the lens of the respective LED element is integrated in the lens element.

In accordance with one implementation example, the at least two LED elements 12, 13 comprise a first LED element 12 having a beam angle substantially corresponding to a minimum beam angle of the flash light beam lobe and a second LED element 13 having a beam angle substantially corresponding to a maximum beam angle of the flash light beam lobe. The control element is then arranged to control the brightness of the first and second LED elements individually based on the rotational position of the zoom element so as to simulate the flash light beam lobe. For improving the accuracy of the simulation even more, at least one third LED element may be present having a beam angle between the beam angles of the first and second LED elements.

Figure 6B:
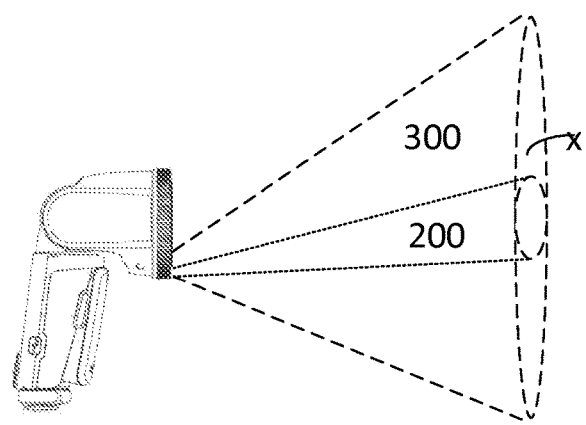
FIG. 6b is a schematic side view of a flash device according to different examples, where LED elements having different beam angles are schematically illustrated.

FIG. 6*b* illustrates schematically a side view of a flash device, where a beam lobe 200 of a first LED element having a beam angle substantially corresponding to a minimum beam angle of the flash light beam lobe is illustrated. Further, a beam lobe 300 of a second LED element having a beam angle substantially corresponding to a maximum beam angle of the flash light beam lobe is illustrated. The brightness of the first and second LED elements may be individually controlled based on the rotational position of the zoom element so as to simulate the flash light beam lobe. For improving the accuracy of the simulation even more, at least one third LED element may be present having a beam angle between the beam angles of the first and second LED elements.

Figure 2:
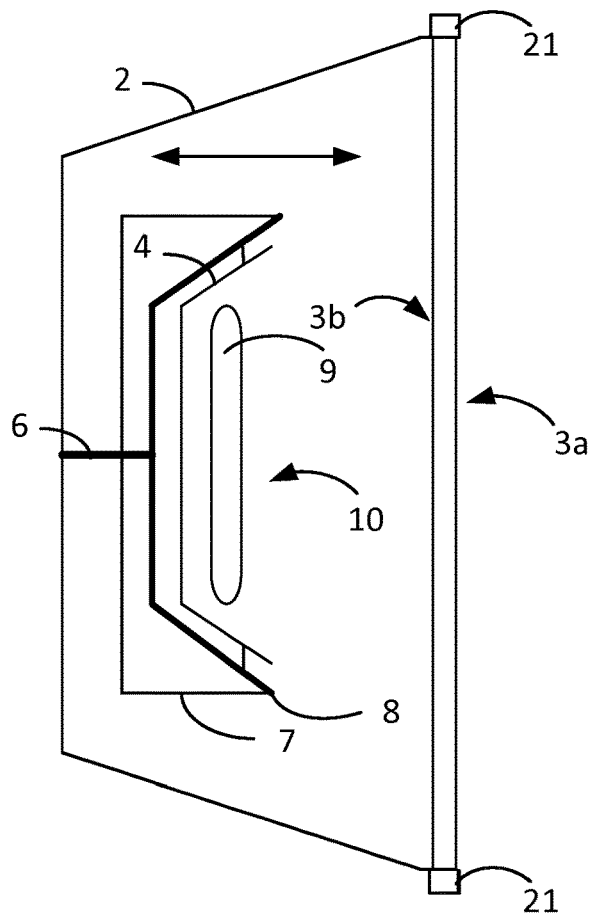
FIG. 2 is a schematic illustration of selected parts of a flash housing.

FIG. 2 schematically illustrates an example of a flash housing 2 for photographic purposes. The flash housing is arranged to emit a flash light having a beam lobe with a desired beam angle. Further, the beam lobe has in one example an essentially circular cross section. The cross section is characteristically arranged perpendicular to a beam axis of the beam lobe.

The flash housing 2 comprises a flash forming element 10 arranged to generate a flash light. The flash forming element 10 comprises in the illustrated example a flash tube 9 partly enclosed by a reflector 4. In a not illustrated example, an alternative flash forming element may be used, for example a lamp and a reflector. The flash tube 9 is in the illustrated example straight. The flash tube may instead have another shape.

The reflector 4 is arranged to reflect at least a part of the flash light emitted from the flash tube in order to direct substantially all of the flash light generated by the flash tube towards a lens element 3. The reflector 4 may further be configured to decrease tube shape characteristics the light to obtain a more round cross section. The reflector 4 has in the illustrated example a three dimensional design. The reflector 4 is in the illustrated example shaped in an essentially oval form. This design secures that substantially all of the flash light generated by the flash tube is directed towards the lens element 3 while at the same time the tube shape characteristics of the light are amended so that the light has a more round cross section.

Normally, if a circular cross section of a beam lobe of a flash light is desired, a circular flash tube, or essentially circular, such as horse shoe shaped, would be selected. In addition, a circular reflector would also be used. However, in this specific case when a straight flash tube is used, the light emitted from the flash tube does not give a beam lobe of a circular cross section. Hence, the emitted beam lobe has to be reshaped in order to be able to create a beam lobe with a circular cross section. This reshaping of the flash light is performed by the shape or form of the reflector in combination with the design of the lens element. Therefore, the shape or form of the reflector in combination with the design of the lens element may be used for forming a beam lobe with a cross section of a desired shape. Thus, by using both the shape or form of the reflector and with the design of the lens element for reshaping the beam lobe, a desired result may be achieved.

The reflector 4 and the flash tube 9 are in the illustrated example arranged in a holding element 8. The holding element 8 may be made of a material which is heat resistant, for example ceramics, glass, metal or similar.

The holding element 8 is in the illustrated example arranged in a carrier 7. The carrier is movably attached to the flash housing 2 by means of a number of guiding elements (not disclosed). The carrier 7 is arranged to be axially movable inside the flash housing 2. A positioner 6 positions the carrier 7 axially in the flash housing 2. In one example, the positioner comprises a step motor. The position of the carrier 7 and thereby the flash tube 9 and the reflector 4 affects a beam angle a of the emitted beam lobe 100. When the carrier is positioned in an end position closest to the lens element, the beam angle a of the beam lobe 100 is a maximum beam angle for the beam lobe. When the carrier is positioned in an end position most distant from the lens element 3, the beam angle a of the beam lobe 100 is minimum beam angle for the beam lobe.

In one example the holding element 8 and the carrier 7 are integrated in one piece.

The flash housing 2 comprises further the lens element 3. The lens element may have a substantially circular cross-section.

The lens element 3 is arranged to let at least part of the flash light generated by the flash forming element out of the housing. Ideally, all of the light generated by the flash forming element is emitted from the flash housing 2. However, some of the flash light may be absorbed by the inner walls of the flash housing 2 etc.

The reflector 4 shape/form and the design of the lens element 3 characteristically cooperate to obtain the flash light beam lobe with an essentially circular cross section x.

The flash housing comprises further a zoom element 21 rotatably arranged at least partly along the circumference of the lens element 3. The zoom element 21 is operatively connected to the flash forming element (not illustrated) so as to control movement of the flash forming element by manual rotation of the zoom element. The zoom element 21 is arranged to control movement of the flash forming element to obtain a flash light having a beam lobe with a desired beam angle.

Figure 3:
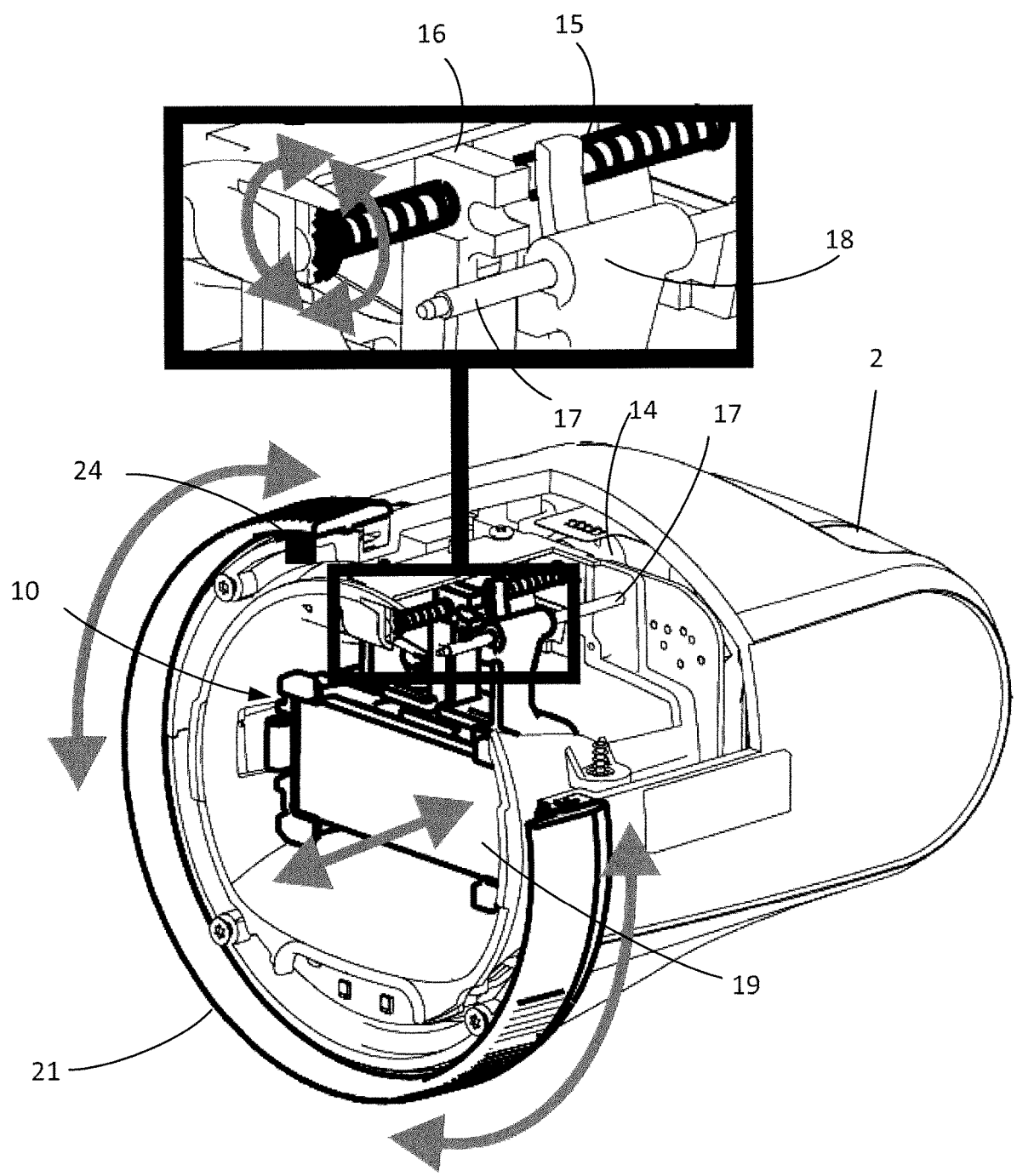
FIG. 3 is a perspective view illustrating an example of the interior of a flash housing.

In FIG. 3, a perspective view of illustrating an example of the interior of a flash housing 2 for photographic purposes is illustrated. The flash housing 2 comprises a zoom element 21 rotatably arranged at least partly along the circumference of the lens element (not shown). The zoom element 21 is operatively connected to the flash forming element 10 so as to control movement of the flash forming element by manual rotation of the zoom element. The zoom element 21 is arranged to control movement of the flash forming element 10 to obtain a flash light having a beam lobe with a desired beam angle.

The flash forming element 10 is axially movable within the flash housing 2 to control the beam angle of the beam lobe.

In one example, the rotational movement of the zoom element 21 is mechanically translated to the axial movement of the flash forming element.

In the example illustrated in FIG. 3, the flash housing 2 comprises a transfer element 24 arranged to transfer the rotational movement or position of the zoom element 21 to an electrical signal. The axial movement or position of the flash forming element 10 is controlled based on the electrical signal. The transfer element 24 comprises for example a potentiometer, a Hall element, optical sensors or the like, arranged to transfer the rotational movement or position of the zoom element to the electrical signal. Different solutions for translating an axial movement or position to an electrical signal are well known in the art and will not be discussed in further detail herein.

The electrical signal controls a positioner 14, 15, 16 for control of the movement or the position of the flash forming element. The flash forming element 10 is axially movable within the flash housing 2 to control the beam angle of the flash light beam lobe. The positioner is arranged to perform control of the positioner between two end positions, wherein when the flash forming element is in a first end position distant from the lens element, the flash light is incident on substantially the entire lens element and when the flash forming element is in a second end position closest to the lens element, the flash light is mainly incident on a center part of the lens element. The flash light beam lobe may have an essentially circular cross section. The cross section is characteristically arranged perpendicular to a beam axis of the beam lobe.

The positioner 14, 15, 16 may comprise a motor 14. The motor may be an electrical motor. The electrical motor may be a step motor 14. The step motor is arranged to provide an angular rotation corresponding to the electrical signal fed to the positioner 14, 15, 16. In the illustrated example, the positioner further comprises a screw element 15. The screw element 15 is rotated axially back and forward by means of the step motor. The positioner may further comprise a guided nut 16 in engagement with the screw element 15. The flash forming element 10 is supported by the guiding nut 16. The guided nut is guided within the flash housing such that it is movable in an axial direction along the screw element and fixed in an angular direction. Thus, the guided nut can not 16 rotate. This is for example obtained by forming a support at least partly around the screw element within which support the guided nut can move axially by being prevented from rotation by the support wall(s). Accordingly, in accordance with this example solution, the flash forming element will be axially controlled back and forward within the flash housing based on the electrical signal provided by the rotation of the zoom element.

In the illustrated example, the flash holding element 10 is supported in a holder, which in turn is fastened to the guided nut 16.

In the illustrated example, the flash forming element, or holder holding the flash forming element, is further supported by at least one guiding pin 17 suspended in the flash housing. This at least one pin is mounted within the housing coaxially with the screw element 15. The function of the at least one simulation light generator element 11 guiding pin 17 is to further secure that the flash forming element is stably arranged within the flash housing and prevented to perform any rotational movements. When the flash holding element is guided by both the screw element and at least one guiding pin, rotational movements around the axis of the screw element/guiding pin(s) and rotational movements along the axis of the screw element/guiding pin(s) may be avoided.

Figure 4:
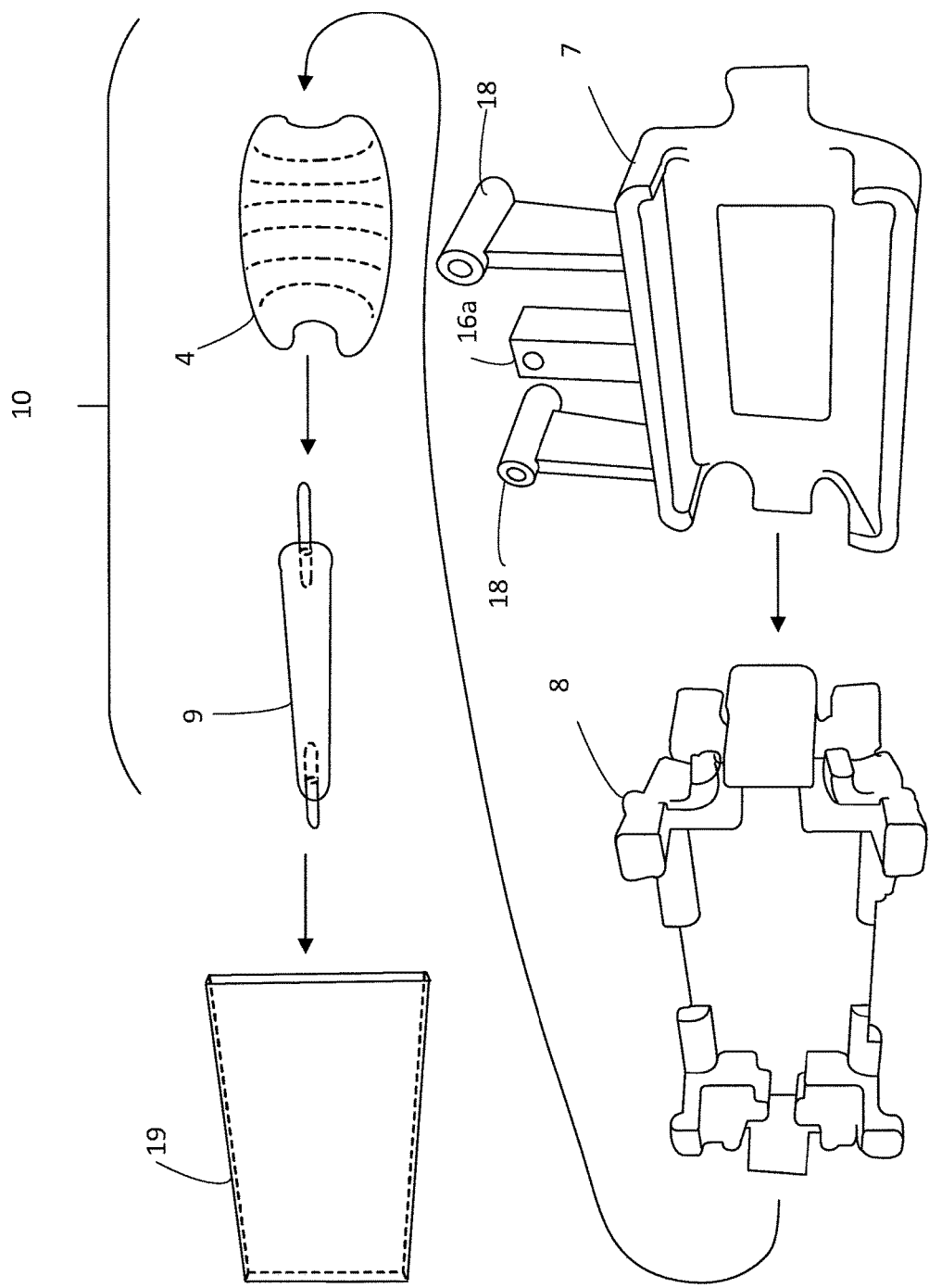
FIG. 4 schematically illustrates components of a flash housing according to different embodiments.
Figure 5:
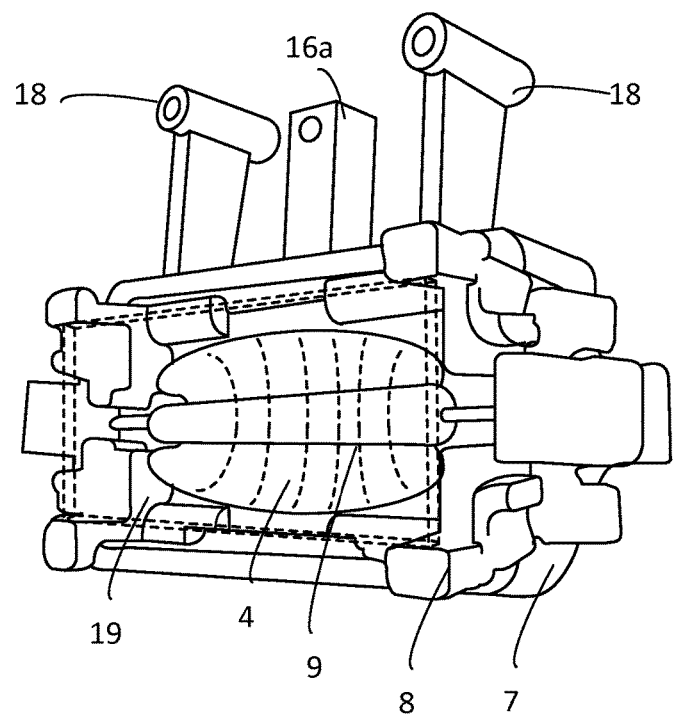
FIG. 5 is a perspective view illustrating the components of FIG. 4 mounted together.

FIGS. 4 and 5 illustrate an example of the design of a flash forming element 10 arranged to generate a flash light and a support therefor. FIG. 4 illustrates an exploded view of exemplified components while FIG. 5 illustrates a mounted view.

In the illustrated FIGS. 4 and 5, the flash forming element 10 comprises a flash tube 9 partly enclosed by a reflector 4. In a not illustrated example, an alternative flash forming element may be used, for example a lamp and a reflector. The flash tube 9 is in the illustrated example elongated. The flash tube 9 is in the illustrated example straight. The flash tube may instead have another shape. However, In small flash devices, such as a flash device which is removably attachable to a camera, the volume within which the flash tube is fitted is limited. It is often difficult to create a small flash tube of a different shape than a straight tube, such as a horse shoe etc.

The reflector 4 may have some or all of the characteristics of the reflector as discussed in relation to FIG. 2.

A semi-transparent element may further be arranged in the beam path after the flash forming element. The semi-transparent element is arranged to transmit light of predetermined first wavelengths and to reflect and/or absorb at least part of light of predetermined second wavelengths generated by the flash forming element.

The reflector 4 and the flash tube 9 and optional semi-transparent element are in the illustrated example arranged in a holding element 8. The holding element 8 may be made of a material which is heat resistant, for example ceramics, glass, metal or similar. In one example, where the semi-transparent element is present, the holding element and the semi-transparent element may encapsulate the flash tube and reflector in a secluded space. When generating flash light, the interior of this this secluded space is characteristically heated. The reflector 4 and flash tube 9 encapsulated within this secluded space can characteristically withstand high temperatures. Components outside this secluded space may then be less heat resistant as a part of the heat is kept within the secluded space.

The holding element 8 is in the illustrated example arranged in a carrier 7. The carrier is movably attached to the flash housing 2 by means of a number of guiding pins and a screw element (not shown). The carrier 7 is arranged to be axially movable inside the flash housing A positioner (not shown) positions the carrier 7 axially in the flash housing 2. In one example, the positioner comprises a step motor. The position of the carrier 7 and thereby the flash tube 9 and the reflector 4 affects a beam angle a of the emitted beam lobe. When the carrier is positioned in an end position closest to the lens element, the beam angle a of the beam lobe 100 is a maximum beam angle for the beam lobe. When the carrier 7 is positioned in an end position most distant from the lens element 3, the beam angle a of the beam lobe 100 is minimum beam angle for the beam lobe.

In a not illustrated example the holding element 8 and the carrier 7 are integrated in one piece.

The carrier 7 has a guided nut 16*a* in for engagement with a screw element (not shown). When the screw element is rotated clockwise and counter-clockwise by means of the step motor, this causes the carrier to move axially back and forward within the flash housing.

The carrier 7 may further have at least one, in the illustrated example two, guiding pin supports 18. At least one guiding pin (not shown) suspended in the flash housing and mounted coaxially with the screw element can then run through the guiding support(s). The at least one guiding pin support 18 is formed as an opening suitable for accommodating the respective guiding pin. The size of the opening is adapted to the size of the pin so that the pin can move freely back and forward therein but with a minimum gap. Thereby the functionality that it is secured that the carrier 7 is stably arranged within the flash housing and prevented to perform any rotational movements. When the carrier 7 is guided by both the screw element and at least one guiding pin, rotational movements around the axis of the screw element/guiding pin(s) and rotational movements along the axis of the screw element/guiding pin(s) may be avoided.

Figure 7:
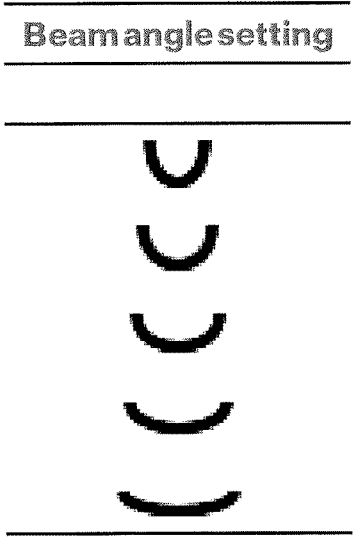
FIG. 7 illustrates examples of different symbol shapes each illustrating a flash light beam angle setting, for display on a display element.

FIG. 7 illustrates an example of different display views for display on a display element. The display element may be formed in a flash device as disclosed in FIGS. 1*a*, 1*b*. The display element may instead be arranged elsewhere at the flash device.

In the illustrated exemplary display views, information related to current beam angles, i.e. the position/movement of the zoom are illustrated by the different display views for display on the display element. The beam angles relate to flash light beam angles and consequently also simulation light beam angles.

In the illustrated example, the display element is arranged to display a symbol, the width of which is dependent on the beam angle. In the particular displayed example, the symbol has a U shape. The symbol instance at the top in figure illustrates a symbol instance representing the minimum beam angle. The symbol instance at the bottom in figure illustrates a symbol instance representing the maximum beam angle. The symbol instances there between illustrate symbol instances between the minimum and maximum beam angle. The number of symbol instances between the minimum and maximum beam angle can be higher and even appear to be continuously vary with the rotation of the zoom element.

Figure 9:
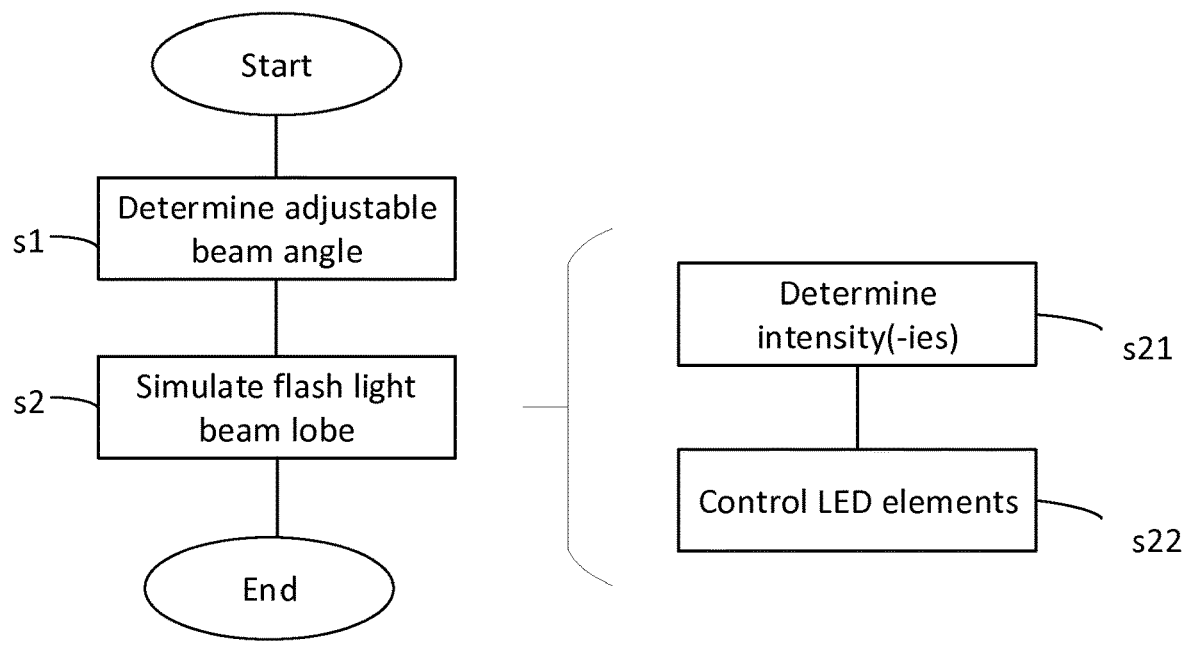
FIG. 9 is a flow chart illustrating an example of a method for simulating a flash light setting of a flash light for photographic purposes.

In FIG. 9, a method for simulating a flash light setting of a flash light for photographic purposes is illustrated. The method comprises a first step s1 of determining an adjustable beam angle of a flash light beam lobe obtainable by means of a flash housing, wherein the flash housing has a flash forming element arranged to generate a flash light and a lens element arranged to let at least a part of the generated flash light out of the flash light housing so as to obtain the flash.

The method further comprises a second step of simulating s2 the flash light beam lobe by means of a simulation light generator element arranged at the lens element, based on the determined beam angle.

In different embodiments, the simulation light generator element comprises at least two light emitting diode, LED, elements having different maximum beam lobes. The simulation step may then comprise steps of determining (s21) at least one intensity or brightness of a simulation light generator element based on the determined beam angle, based on the determined beam angle, and controlling (s22) the at least two LED elements in accordance with the determined intensities or brightnesses.

What is claimed is:

1. A flash housing for photographic purposes, said flash housing comprising
   a flash forming element arranged to generate a flash light,
   a lens element arranged to let at least part of the generated flash light out of the flash housing so as to obtain the flash,
   wherein the obtainable flash light has a beam lobe with a controllable beam angle and
   wherein the flash housing further comprises a simulation light generator element for simulation of the obtainable flash light beam lobe having the controllable beam angle.

2. The flash housing according to claim 1, wherein the simulation light generator element is arranged at or adjacent to the lens element.

3. The flash housing according to claim 1, wherein the simulation light generator element comprises at least two light emitting diode, LED, elements, having different beam angles.

4. The flash housing according to claim 3, wherein the flash housing comprises a control element arranged to control the brightness of the at least two LED elements in accordance with a determined beam angle of the flash light beam lobe.

5. The flash housing according to claim 3, wherein the respective LED element comprises a LED and a lens arranged in the beam path after the LED.

6. The flash housing according to claim 5, wherein the lens of the respective LED element is integrated in the lens element.

7. The flash housing according to claim 3, wherein the at least two LED elements comprise a first LED element having a beam angle substantially corresponding to a minimum beam angle of the flash light beam lobe and a second LED element having a beam angle substantially corresponding to a maximum beam angle of the flash light beam lobe.

8. The flash housing according to claim 1, further comprising a zoom element rotatably arranged at least partly along the circumference of the lens element for manual control of the simulation light generator element in accordance with the rotational position and/or movement of the zoom element.

9. The flash housing according to claim 8, wherein the zoom element is operatively connected to the flash forming element so as to control movement of the flash forming element by manual rotation of the zoom element.

10. The flash housing according to claim 9, wherein the flash forming element is axially movable within the flash housing to control the beam angle of the beam lobe.

11. The flash housing according to claim 10, wherein when the flash forming element is in a first end position distant from the lens element, the flash light is incident on substantially the entire lens element and when the flash forming element is in a second end position closest to the lens element, the flash light is incident on a center part of the lens element.

12. The flash housing according to claim 8, further comprising a transfer element arranged to transfer the rotational movement or position of the zoom element to an electrical signal, wherein the intensities of the LED elements are controlled based on the electrical signal.

13. The flash housing according to claim 12, wherein the transfer element comprises a potentiometer, a Hall element, or optical sensors or the like, arranged to transfer the rotational movement or position of the zoom element to the electrical signal.

14. The flash housing according to claim 12, further comprising a display element, wherein the information related to the electrical signal is fed to the display element for display of information related to the simulated flash light beam angle.

15. The flash housing according to claim 14, wherein the display element is arranged to display a symbol, the width of which is dependent on the simulated flash light beam angle.

16. The flash housing according to claim 15, wherein the symbol has a U shape.

17. The flash housing according to claim 1, wherein the simulated flash light beam lobe has an essentially circular cross section.

18. A method for simulating a flash light setting of a flash light for photographic purposes, said method comprising
determining an adjustable beam angle of a flash light beam lobe obtainable of a flash housing having a flash forming element arranged to generate a flash light and a lens element arranged to let at least a part of the generated flash light out of the flash light housing so as to obtain the flash, and
simulating the flash light beam lobe of a simulation light generator element arranged at the lens element, based on the determined beam angle.

19. The method according to claim 18, wherein the simulation light generator element comprises at least two light emitting diode, LED, elements having different beam angles and wherein the simulation step comprises
determining at least one intensity or brightness of a simulation light generator element based on the determined beam angle, and
controlling the at least two LED elements in accordance with the determined intensities or brightnesses.

* * * * *

UNITED STATES PATENT AND TRADEMARK OFFICE
CERTIFICATE OF CORRECTION

| | | |
|---|---|---|
| PATENT NO. | : 11,054,722 B2 | Page 1 of 1 |
| APPLICATION NO. | : 16/646118 | |
| DATED | : July 6, 2021 | |
| INVENTOR(S) | : Emil Stenbacka et al. | |

It is certified that error appears in the above-identified patent and that said Letters Patent is hereby corrected as shown below:

In the Specification

In Column 4, Line 10, delete "together," and insert --together.--.

In Column 9, Line 32, delete "housing" and insert --housing 2.--.

In the Claims

In Column 12, Claim 13, Line 3, after "sensors" delete "or the like".

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*